(12) United States Patent
LoPresti

(10) Patent No.: US 9,772,088 B1
(45) Date of Patent: Sep. 26, 2017

(54) HIGH INTENSITY DISCHARGE MULTIPLE LIGHT ARRAY SYSTEM

(71) Applicant: David Ralph LoPresti, Vero Beach, FL (US)

(72) Inventor: David Ralph LoPresti, Vero Beach, FL (US)

( * ) Notice: Subject to any disclaimer, the term of this patent is extended or adjusted under 35 U.S.C. 154(b) by 0 days.

(21) Appl. No.: 14/711,189

(22) Filed: May 13, 2015

Related U.S. Application Data

(60) Provisional application No. 61/992,341, filed on May 13, 2014.

(51) Int. Cl.
| | |
|---|---|
| F21V 7/00 | (2006.01) |
| F21V 7/05 | (2006.01) |
| F21V 7/22 | (2006.01) |
| F21S 8/10 | (2006.01) |

(52) U.S. Cl.
CPC ............ F21V 7/05 (2013.01); F21S 48/1186 (2013.01); F21S 48/1388 (2013.01); F21V 7/22 (2013.01)

(58) Field of Classification Search
CPC .... B64D 2203/00; B64D 47/02; B61D 29/00; F21S 48/1186; F21S 48/1388; F21S 48/1394
See application file for complete search history.

(56) References Cited

U.S. PATENT DOCUMENTS

| | | | | |
|---|---|---|---|---|
| 5,119,275 | A | * | 6/1992 | Makita ................. B60Q 1/0094 362/459 |
| 6,123,429 | A | * | 9/2000 | Osawa ................ F21S 48/1388 313/113 |
| 6,313,570 | B1 | | 11/2001 | Bergkvist et al. |
| 6,439,752 | B1 | | 8/2002 | Petrick |
| 6,478,459 | B1 | * | 11/2002 | Ui ........................ F21S 48/1186 362/277 |
| 6,744,210 | B2 | | 6/2004 | Petrick |
| 7,008,079 | B2 | | 3/2006 | Smith |
| 7,244,047 | B2 | | 7/2007 | Powell |
| 7,563,003 | B2 | | 7/2009 | Powell |
| 8,100,552 | B2 | | 1/2012 | Spero |
| 8,579,480 | B2 | | 11/2013 | Willeke et al. |
| 2002/0053863 | A1 | * | 5/2002 | Yamaguchi .......... F21S 48/1109 313/25 |
| 2008/0137353 | A1 | | 6/2008 | Larsen et al. |
| 2008/0175013 | A1 | | 7/2008 | McClelland |
| 2012/0313547 | A1 | | 12/2012 | Barnett et al. |
| 2013/0249375 | A1 | | 9/2013 | Panagotacos et al. |

FOREIGN PATENT DOCUMENTS

| | | | |
|---|---|---|---|
| CN | 202419414 U | | 9/2012 |
| CN | 203927811 U | * | 11/2014 |

* cited by examiner

*Primary Examiner* — Alexander Garlen
(74) *Attorney, Agent, or Firm* — Lott & Fischer, PL

(57) ABSTRACT

A multiple light high intensity discharge ("HID") array designed for retrofit aviation application. The present invention provide better light beams, reduces the energy needed to power landing/taxiing lights, and allows for customization of the beam through the depth of the HID bulb.

13 Claims, 3 Drawing Sheets

HIGH INTENSITY DISCHARGE MULTIPLE LIGHT ARRAY SYSTEM

CLAIM OF PRIORITY

This application is being filed as a non-provisional patent application under 35 U.S.C. §111(b) and 37 CFR §1.53(c). This application claims priority under 35 U.S.C. §111(e) to U.S. provisional patent application Ser. No. 61/992,341 filed on May 13, 2014, the contents of which are incorporated herein by reference in their entirety.

FIELD OF INVENTION

The present invention relates generally to lighting equipment, and specifically to a multiple light high intensity discharge ("HID") array for a retrofit aviation application.

BACKGROUND OF THE INVENTION

Aviation requires different types of lights based on the activity and state of the aircraft. Landing lights are designed to focus light far enough ahead of the aircraft to illuminate the landing strip. Typical landing light beam patterns are focused in a spotlight manner for maximum distance and penetration but require a beam angle wide enough to illuminate a typical 100' to 150' wide landing strip. Beam angles range from 10 to 15 degrees. Designs vary, with the number of landing lights ranging from one to four. Taxi lights are used during ground operations to provide illumination on landing strips, taxiways and near hangars. Beam angles for taxi lights range from 18 to 40 degrees. Recognition lights are used in flight to provide illumination of the aircraft for outside observers and flight safety.

Stock aviation lights are incandescent lamps similar to standard household lights but with a more robust design for ruggedness. Most use a parabolic reflector design and are sized by the PAR standard established in ANSI C79.1 American National Standard. Lamp sizes are determined by the outer diameter of the lamp in inches divided by 8. For example, a PAR 36 lamp is 4.5" in diameter, a PAR 46 lamp is 5.75" in diameter, etc.

Standard landing light lamps are adapted for power in the 250 to 600 watt range. Standard taxi lights have power ratings in the 100 to 250 watt range.

Standard replacement or "OEM" HID lighting components use single parabolic reflectors having a circular profile, are designed to a PAR standard, and contain a single HID bulb and ballast. The present invention, in contrast, incorporates two or more reflectors and a like number of HID bulbs inside a circular housing with a mounting ring that is sized to replace a stock lamp in a standard PAR size.

SUMMARY OF THE INVENTION

Several benefits are provided by the present invention. A standard single HID lighting component produces multiple times the effective light output of a standard incandescent lamp. The light color is of a higher Kelvin temperature and therefore appears to be whiter, rather than yellowish. This increases the contrast between lit and unlit areas and appears brighter to the human eye. A multiple HID light array provides these same benefits but with a multiplier effect based on the number of reflectors in the array. This increases light output within the same footprint. Multiple HID lights provide redundancy should one light in the array fail during flight operations. Since the light output from a single HID bulb is adequate for safe illumination, the safety aspect for the aircraft is enhanced. The HID bulbs may be set in different positions to change the length, width or direction of the light beam. In spite of multiple HID bulbs, the electrical current draw is still significantly lower than the stock incandescent lamp draw due to the reduced power requirements. This lowers the demand on the aircraft power generation system, thereby increasing the life of the system and lowering the possibility of electrical system problems or failure.

DESCRIPTION OF INVENTION

In one embodiment of the present invention, the circular mounting ring has the same outer dimensions as those specified in ANSIC78_21 American National Standard. This ensures that the present invention will be able to retroactively fit into holding fixtures designed to contain the standard PAR stock lamp.

Figure 1:
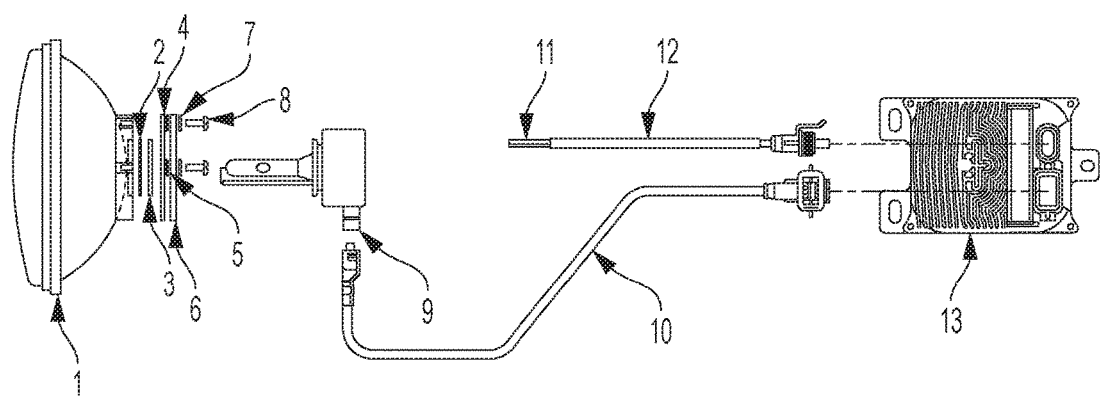
FIG. 1 illustrates an HID fixture representative of the prior art.
Figure 2:
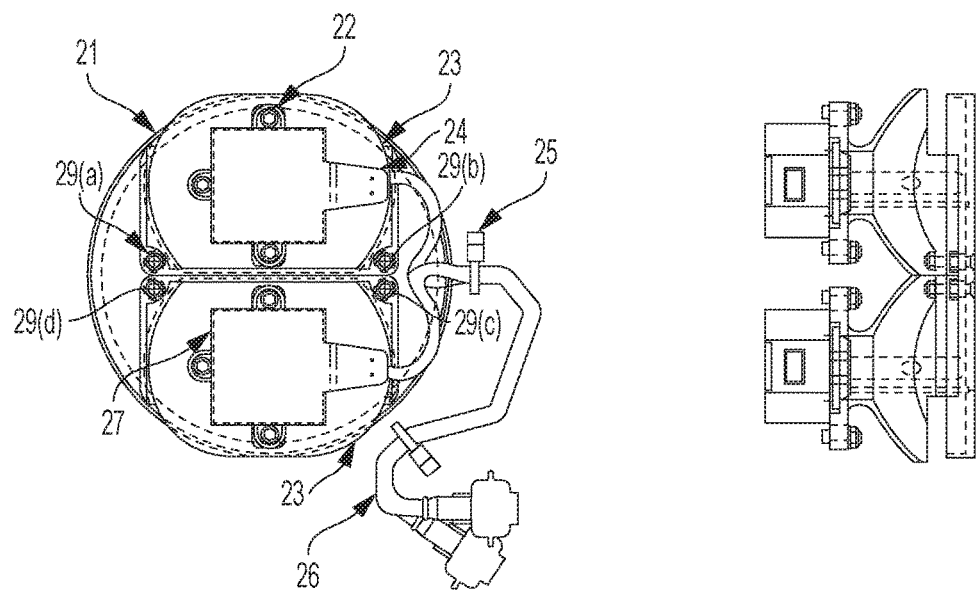
FIG. 2 illustrates front and side views of an HID fixture in accordance with the present invention with the assembly ring removed.
Figure 3:
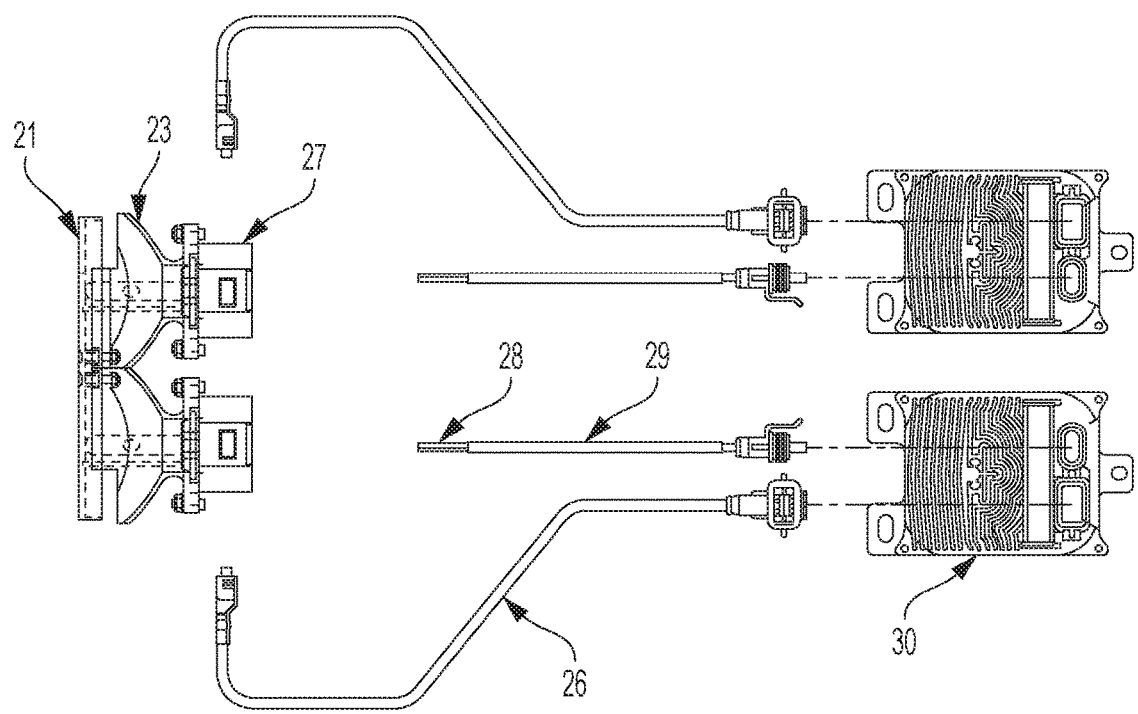
FIG. 3 is an exploded view of an HID fixture in accordance with the present invention.

As shown in FIGS. 2 and 3, the shown embodiment consists of two or more rectangular reflectors 23 inside the mounting ring. The rectangular reflectors 23 are normally trimmed so that the outer edges do not protrude beyond the edge of the mounting ring 21 to avoid interference with surrounding mounting structures. In some cases the mounting structure is designed such that these precautions are not required. Each reflector 23 hosts an HID bulb 27 and a harness 26 that connects to a HID ballast 30. Each ballast 30 is connected to the aircraft stock positive and ground wiring system 28. This pre-established wiring system also contains the switch and circuit breaker for the light(s). The rectangular reflector 23 is of proprietary design. The optics are computer designed and the reflector is made of cast or machined aluminum. The reflective surfaces are highly polished and aluminum coated for maximum reflectivity.

The rectangular reflectors 23 are each connected to separate HID bulbs 27. The HID bulb 27 is then connected to a ballast 30 by way of a ballast to lamp harness 26. The ballast controls 30 the power supplied to the HID bulb 27. The ballast 30 is connected by a ballast to power harness 29 to a power source 28. The power source 28 should have the capability to control the HID bulbs 27, and determine if the bulbs are powered on.

Figure 4:
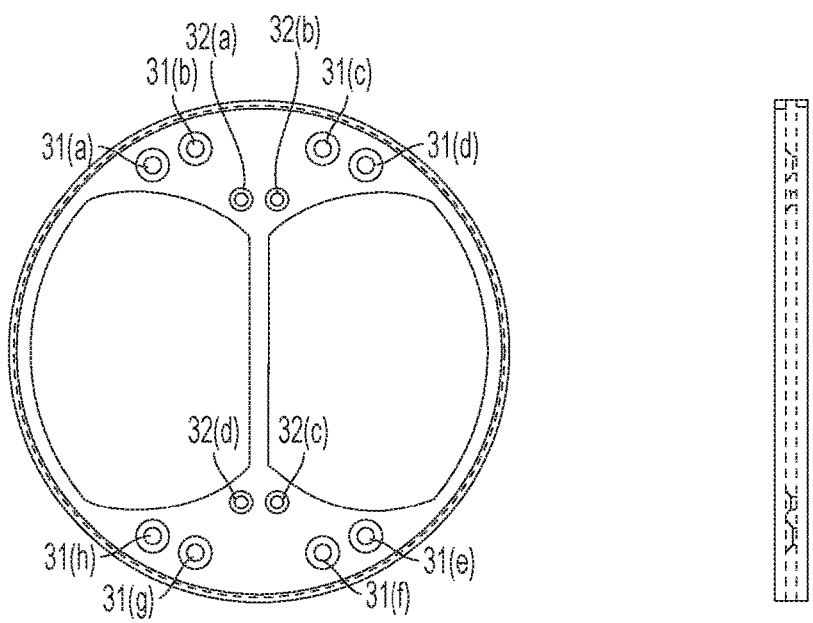
FIG. 4 illustrates front and side views of the assembly ring of an HID fixture in accordance with the present invention.

As shown in FIGS. 2, 3, and 4, the HID bulbs 27 are covered by a mounting ring 21. The mounting ring 21 is attached to the HID bulbs 27 by aligning the open holes on the reflector 29 (a)-(d) with the open holes on the mounting ring 32 (a)-(d) and inserting a screw or other similar object. These screws maintain the stability between the mounting ring 21 and the reflector 23. The mounting ring 21 can then be attached to the aircraft by riveting the mounting ring 21 to the aircraft through the outer holes 31 (a)-(h).

Figure 5:
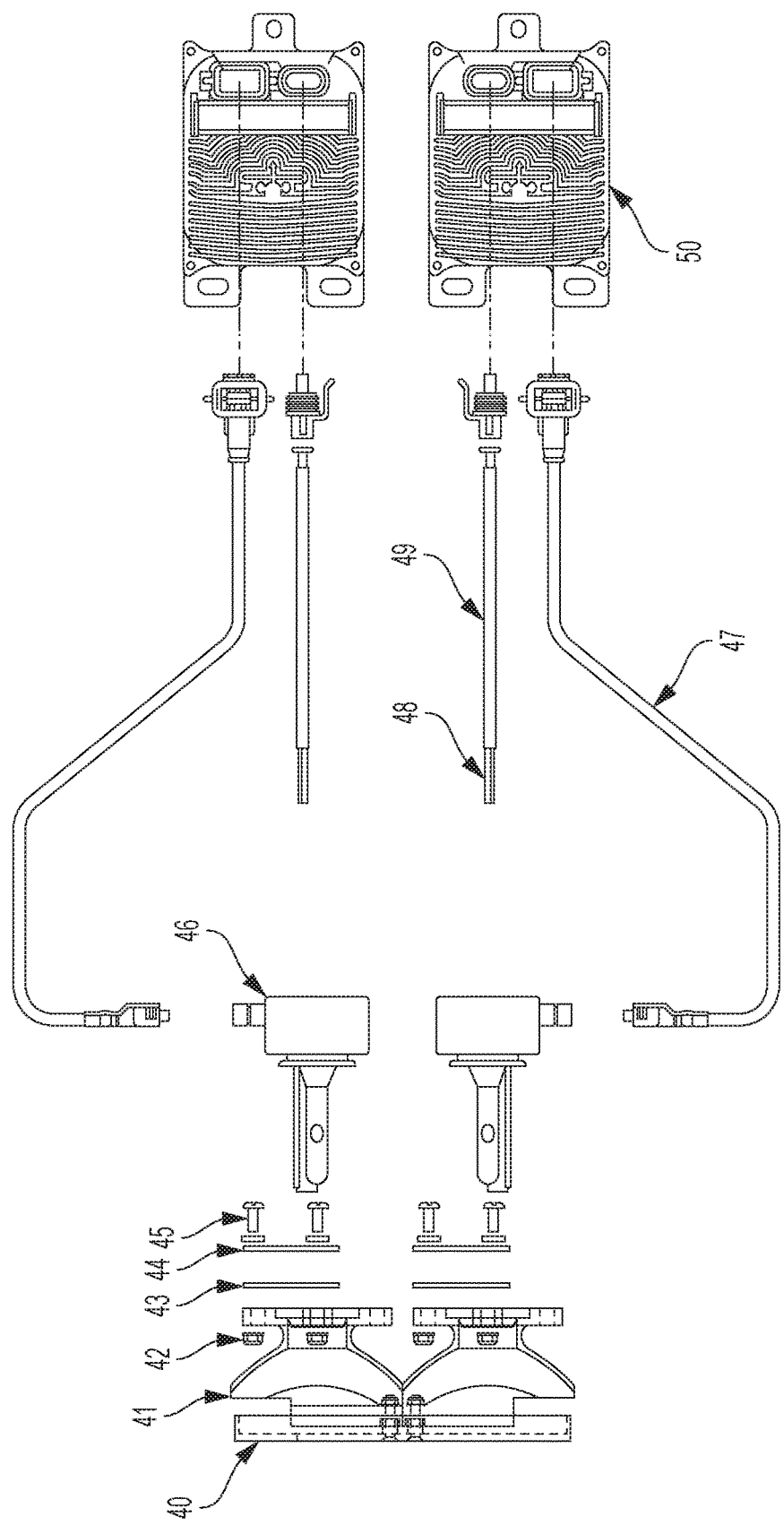
FIG. 5 is an exploded view of another embodiment of an HID fixture in accordance with the present invention.

As shown in FIG. 5, in another embodiment of the present invention, the placement of the HID Bulb 46 can be modified to alter the shape and direction of the light beam. In this embodiment, when the HID bulb 46 is inserted into the reflector 41, a tuning plate 43 is inserted between the HID Bulb 46 and the reflector 41 as additional shim. The tuning plate 43 can be of variable width, which alters the depth of the HID bulb 46 within the reflector 41, altering the width of the beam. If the tuning plate 43 is wider, the HID bulb 46 will be set further back into the reflector 41 and will thus widen the beam. Alternatively, if the tuning plate 43 is narrower, the HID bulb 46 will be set further forward into the reflector 41 and will narrow the beam. A mounting ring 40 is used to covert the HID bulb 46. The tuning plate 43 is attached to the housing by a retaining screw 45 that is inserted through a washer 44 then through the tuning plate 43, before being locked into place by a locknut 42. The user may choose to set each HID bulb in the array in different positions within their respective reflectors to create different light beam orientations.

In yet another embodiment, tuning plate 43 can be designed to only engage one, two or three of the fasteners attaching each HID Bulb 46 to the reflector 41. Alternatively, separate tuning plates 43, of varying thicknesses, could be used between the reflector 41 and each of the HID Bulbs 46. Such an arrangement would allow each HID Bulb 46 to have a different tilt angle with respect to its corresponding reflector 41, which would, in turn, result in a different beam direction for the light emitted by each reflector 41. These embodiments would permit almost infinite customization of beam angle and direction combinations for the multiple lights in the HID array.

Other embodiments of the present invention include three or more rectangular reflectors. Other embodiments can also incorporate two or more non-rectangular reflectors, such as circular, square, elliptical or oval-shaped reflectors, as well as a mix of differently shaped reflectors. Additionally, the present invention can be utilized by new products or be designed for a retrofit application. The present invention may also be adapted to include bulbs that are not HID or multiple different bulb types in a single array.

Accordingly, it will be understood that the preferred embodiment of the present invention has been disclosed by way of example and that other modifications and alterations may occur to those skilled in the art without departing from the scope and spirit of the appended claims.

I claim:

1. A multiple light array comprising:
a mounting ring adapted to fit within an existing standard-sized lighting opening;
a housing adapted to fit within said mounting ring;
two or more reflectors disposed within said housing;
two or more high intensity discharge light bulbs, each of said light bulbs disposed in front of each of said reflectors;
wherein at least one variable width tuning plate is inserted between each of said reflectors and corresponding light bulb for altering the depth of each light bulb relative the corresponding reflector, two or more of said variable width tuning plates having different thicknesses relative one another allowing each light bulb to have a different tilt angle with respect to its corresponding reflector;
wherein each of said light bulbs is electrically connected to a ballast by a ballast-to-lamp harness; and
wherein each ballast is electrically connected to a power source by a ballast-to-power harness.

2. The multiple light array of claim 1, wherein said reflectors are trimmed so that they do not protrude beyond the edge of said mounting ring.

3. The multiple light array of claim 1, wherein one or more of the reflectors is ovular.

4. The multiple light array of claim 1, wherein one or more of the reflectors is circular.

5. The multiple light array of claim 1, wherein one or more of the reflectors is rectangular.

6. The multiple light array of claim 1, wherein one or more of the reflectors is square.

7. The multiple light array of claim 1, wherein one or more of the reflectors is elliptical.

8. The multiple light array of claim 1, wherein one or more of the reflectors is triangular.

9. The multiple light array of claim 1, wherein the reflectors are different shapes.

10. The multiple light array of claim 1, wherein one or more of the reflectors is highly polished.

11. The multiple light array of claim 1, wherein one or more of the reflectors is aluminum coated.

12. The multiple light array of claim 1, wherein all of said variable width tuning plates have the same width.

13. The multiple light array of claim 1, wherein all of the reflectors have the same shape.

* * * * *